United States Patent
Huang et al.

(10) Patent No.: US 7,518,684 B2
(45) Date of Patent: Apr. 14, 2009

(54) PIXEL STRUCTURE AND LIQUID CRYSTAL DISPLAY PANEL

(75) Inventors: Shu-I Huang, Taipei (TW); Wei-Chieh Sun, Taipei County (TW); Chih-Yu Peng, Hsinchu (TW); Ya-Chieh Chen, Hsinchu (TW); Chai-Ling Lai, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 282 days.

(21) Appl. No.: 11/465,128

(22) Filed: Aug. 17, 2006

(65) Prior Publication Data

US 2007/0268434 A1    Nov. 22, 2007

(30) Foreign Application Priority Data

May 19, 2006  (TW) ............................... 95117813 A

(51) Int. Cl.
*G02F 1/1337* (2006.01)
(52) U.S. Cl. .................. 349/129; 349/141; 349/143; 349/146
(58) Field of Classification Search ........... 349/129, 349/143, 146
See application file for complete search history.

(56) References Cited

U.S. PATENT DOCUMENTS

| | | | |
|---|---|---|---|
| 5,831,700 A | 11/1998 | Li et al. | |
| 6,133,975 A | 10/2000 | Li et al. | |
| 6,583,838 B1 | 6/2003 | Hoke et al. | |
| 2003/0067579 A1 | 4/2003 | Inoue et al. | |
| 2004/0095536 A1 | 5/2004 | Yoshida et al. | |
| 2007/0247559 A1* | 10/2007 | Tasaka et al. ................. 349/46 |

FOREIGN PATENT DOCUMENTS

| | | |
|---|---|---|
| JP | 2001-235752 | 8/2001 |
| JP | 2003-149647 | 5/2003 |

\* cited by examiner

*Primary Examiner*—Richard H Kim
(74) *Attorney, Agent, or Firm*—Jianq Chyun IP Office

(57) ABSTRACT

A pixel structure including an active device, a first pixel electrode, a second pixel electrode, a coupling line, a common electrode, and a liquid crystal layer is provided. The first pixel electrode and the second pixel electrode have a plurality of sets of stripped electrode patterns extending along different directions, respectively, and the first pixel electrode is electrically insulated from the second pixel electrode. The coupling line is disposed under the first and the second pixel electrode and electrically insulated from the second pixel electrode. The first pixel electrode is electrically connected to the active device through the coupling line. The common electrode is disposed over the first and the second pixel electrode. The liquid crystal layer is disposed between the common electrode and the first and second pixel electrodes. Moreover, the liquid crystal layer has two polymer layers and a liquid crystal molecule layer disposed between the polymer layers.

21 Claims, 11 Drawing Sheets

PIXEL STRUCTURE AND LIQUID CRYSTAL DISPLAY PANEL

This application claims the benefit of Taiwan Patent Application Serial No. 95117813, filed on May 19, 2006. All disclosure of the Taiwan application is incorporated herein by reference.

BACKGROUND OF THE INVENTION

1. Field of Invention

The present invention relates to a pixel structure. More particularly, the present invention relates to a pixel structure using polymer-stabilized alignment.

2. Description of Related Art

In response to the increasing demand of displays, the industry put efforts in the development of the display. Among the displays, the cathode ray tube (CRT) has occupied the display market for many years, due to its high display quality and mature technology. However, the rising "environmental protection" awareness is against its power consumption and radiation disadvantage, and the limited flattening capability is against the market demands, and thus the cathode ray tube (CRT) cannot meet the market demands gradually. Therefore, the thin film transistor liquid crystal display (TFT-LCD), having superior properties such as high image quality, good space utilization, low power consumption, and no radiation, has become the mainstream display product of the market.

Currently, the market demands for the performance of LCDs includes high contrast ratio, no gray scale inversion, little color shift, high luminance, high color enrichment, high color saturation, fast response, and wide viewing angle. Technologies for achieving wide viewing angle comprises the twist nematic liquid crystal with wide viewing film, the in-plane switching (IPS) LCD, the fringe field switching LCD, and the multi-domain vertically alignment (MVA), etc.

FIG. 1A is a schematic sectional view of a conventional MVA LCD panel, and FIG. 1B is a top view of a TFT array substrate of the LCD panel as shown in FIG. 1A, wherein the schematic sectional view of the TFT array substrate in FIG. 1A is taken along the section line A-A' in FIG. 1B. Referring to FIGS. 1A and 1B, the conventional MVA LCD panel 10 comprises a TFT array substrate 20, a color filter substrate 30, and a liquid crystal layer 40. The liquid crystal layer 40 is disposed between the TFT array substrate 20 and the color filter substrate 30.

The color filter substrate 30 comprises a glass substrate 31, a color filter layer 32, a common electrode 33, and a plurality of protrusions 34. The color filter layer 32 is disposed over the glass substrate 31. The common electrode 33 is disposed on the color filter layer 32. The protrusions 34 are disposed on the common electrode 33.

The TFT array substrate 20 comprises a glass substrate 21, a plurality of scan lines 22, a plurality of data lines 23, a plurality of TFTs 24, a plurality of transparent electrodes 25, and a plurality of common lines 26. The scan lines 22 and the data lines 23 are disposed on the glass substrate 21. Each of the TFTs 24 is electrically connected to one of the scan lines 22 and one of the data lines 23, respectively. Each of the transparent electrodes 25 is electrically connected to one of the TFTs 24, respectively, and crosses one of the common lines 26.

It should be noted that the transparent electrodes 25 have a plurality of slits 25a. The slits 25a together with the protrusions 34 make liquid crystal molecules in the liquid crystal layer 40 being inclined in multiple directions, such that the scope of viewing angle of the MVA LCD panel 10 is increased. Therefore, the MVA LCD panel 10 meets the requirement of wide viewing angle.

Though the scope of viewing angle of the MVA LCD panel 10 can be increased by the slits 25a together with the protrusions 34, when the MVA LCD panel 10 displays images, the color wash-out still occurs if the MVA LCD panel 10 is viewed at a large angle.

SUMMARY OF THE INVENTION

Accordingly, an object of the present invention is to provide a pixel structure, suitable for eliminating the phenomenon of color wash-out of LCD panels, and increasing the aperture ratio of LCD panels to enhance the luminance of the LCD panels.

Another object of the present invention is to provide an LCD panel with preferable aperture ratio and high luminance.

In order to achieve the above-mentioned or other objects, the present invention provides a pixel structure, which comprises an active device, a first pixel electrode, a second pixel electrode, a coupling line, a common electrode, and a liquid crystal layer. The first pixel electrode and the second pixel electrode have a plurality of sets of first stripped electrode patterns and second stripped electrode patterns extending along different directions respectively, and the second pixel electrode is electrically insulated from the first pixel electrode. The coupling line is disposed under the first pixel electrode and the second pixel electrode, and is electrically insulated from the second pixel electrode. The first pixel electrode is electrically connected to the active device through the coupling line. The common electrode is disposed over the first pixel electrode and the second pixel electrode, and is formed without alignment patterns. The liquid crystal layer is disposed between the common electrode and the first pixel electrode and between the common electrode and the second pixel electrode. Moreover, the liquid crystal layer has a liquid crystal molecule layer and two polymer layers, and the liquid crystal molecule layer is disposed between the polymer layers.

According to the pixel structure as described in an embodiment of the present invention, the material of the polymer layers may be an acrylic polymer.

According to an embodiment of the present invention, the pixel structure further comprises a common line and a capacitor electrode, wherein the capacitor electrode is disposed over the common line and is electrically connected to the first pixel electrode. In addition, the common line is disposed under the first pixel electrode, and the first pixel electrode crosses the common line. In another embodiment, the first pixel electrode and the second pixel electrode can be disposed on two opposite sides of the common line, respectively. In an alternative embodiment, the pixel structure further comprises a dielectric layer disposed between the capacitor electrode and the common line. In another embodiment, the second pixel electrode comprises a first sub-pixel electrode and a second sub-pixel electrode. The first sub-pixel electrode and the second sub-pixel electrode are disposed on two opposite sides of the first pixel electrode, respectively.

According to the pixel structure as described in an embodiment of the present invention, the second pixel electrode comprises a first sub-pixel electrode and a second sub-pixel electrode. The first sub-pixel electrode and the second sub-pixel electrode are disposed on two opposite sides of the scan line, and are electrically connected, respectively.

According to the pixel structure as described in an embodiment of the present invention, four alignment regions are defined by the plurality of sets of first stripped electrode patterns of the first pixel electrode.

According to the pixel structure as described in an embodiment of the present invention, four alignment regions are defined by the plurality of sets of second stripped electrode patterns of the second pixel electrode.

The present invention further provides an LCD panel, which comprises a lower substrate, an upper substrate, a color filter array, and a plurality of pixel structures. The upper substrate is disposed over the lower substrate. The color filter array is disposed between the upper substrate and the lower substrate. The pixel structures are disposed between the color filter array and the lower substrate. Each of the pixel structures is electrically connected to a scan line and a data line. Each of the pixel structures comprises an active device, a first pixel electrode, a second pixel electrode, a coupling line, a common electrode, and a liquid crystal layer. The active device is electrically connected to the scan line and the data line. The first pixel electrode has a plurality of sets of first stripped electrode patterns extending along different directions. The second pixel electrode has a plurality of sets of second stripped electrode patterns extending along different directions, and is electrically insulated from the first pixel electrode. The coupling line is disposed under the first pixel electrode and the second pixel electrode, and is electrically insulated from the second pixel electrode. The first pixel electrode is electrically connected to the active device through the coupling line. The common electrode is disposed over the first pixel electrode and the second pixel electrode, and is formed without alignment patterns. The liquid crystal layer is disposed between the common electrode and the first pixel electrode and between the common electrode and the second pixel electrode. Moreover, the liquid crystal layer has a liquid crystal molecule layer and two polymer layers. The liquid crystal molecule layer is disposed between the polymer layers.

According to the LCD panel as described in an embodiment of the present invention, the polymer layers comprise an acrylic polymer.

According to the LCD panel as described in an embodiment of the present invention, each of the pixel structures further comprises a common line and a capacitor electrode. The capacitor electrode is disposed over the common line, and is electrically connected to the first pixel electrode.

According to the LCD panel as described in an embodiment of the present invention, the common line in each of the pixel structures is disposed under the first pixel electrode, and the first pixel electrode crosses the common line.

According to the LCD panel as described in an embodiment of the present invention, the first pixel electrode and the second pixel electrode in each of the pixel structures are disposed on two opposite sides of the common line, respectively.

According to the LCD panel as described in an embodiment of the present invention, each of the pixel structures further comprises a dielectric layer disposed between the capacitor electrode and the common line.

According to the LCD panel as described in an embodiment of the present invention, the second pixel electrode in each of the pixel structures comprises a first sub-pixel electrode and a second sub-pixel electrode, wherein the first sub-pixel electrode and the second sub-pixel electrode are disposed on two opposite sides of the first pixel electrode, respectively.

According to the LCD panel as described in an embodiment of the present invention, the second pixel electrode in each of the pixel structures comprises a first sub-pixel electrode and a second sub-pixel electrode. The first sub-pixel electrode and the second sub-pixel electrode are disposed on two opposite sides of the scan line, and are electrically connected, respectively.

According to the LCD panel as described in an embodiment of the present invention, four alignment regions are defined by the plurality of sets of first stripped electrode patterns of the first pixel electrode in each of the pixel structure.

According to the LCD panel as described in an embodiment of the present invention, four alignment regions are defined by the plurality of sets of second stripped electrode patterns of the second pixel electrode in each of the pixel structure.

In view of the above, in the LCD panel of the present invention, the liquid crystal molecule layer in the pixel structure is affected by the two polymer layers, such that the liquid crystal molecules present specific arrangements. In addition, the coupling line and the second pixel electrode constitute a coupling capacitor. If the capacitance value of the coupling capacitor is adjusted, the inclination degree of the liquid crystal molecules over the first pixel electrode and the second pixel electrode is changed. In this manner, the phenomenon of color wash-out of LCD panels can be eliminated. And LCD panels with the pixel structure will have high aperture ratio and high luminance.

In order to make the aforementioned and other objects, features and advantages of the present invention comprehensible, preferred embodiments accompanied with figures are described in detail below.

DESCRIPTION OF EMBODIMENTS

The First Embodiment

Figure 1A:
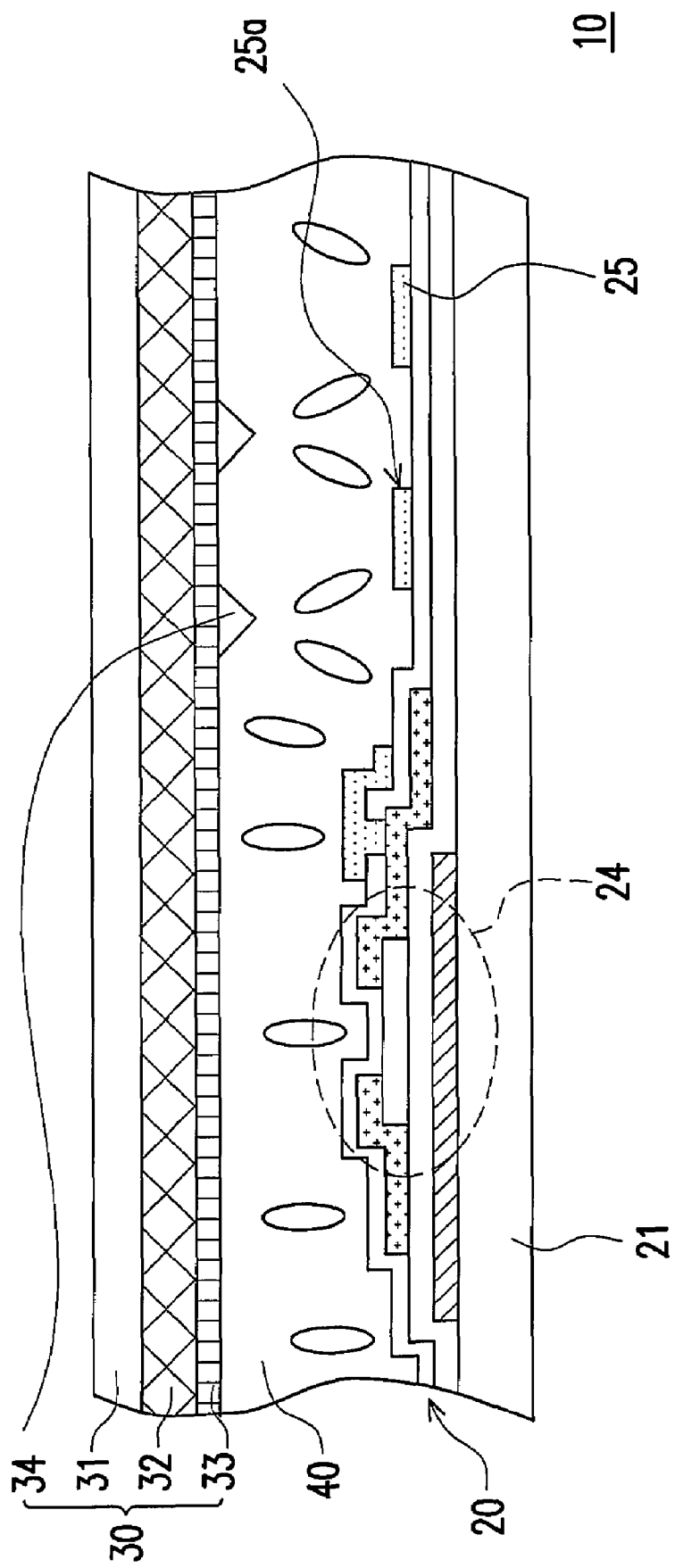
FIG. 1A is a schematic sectional view of a conventional MVA LCD panel.
Figure 1B:
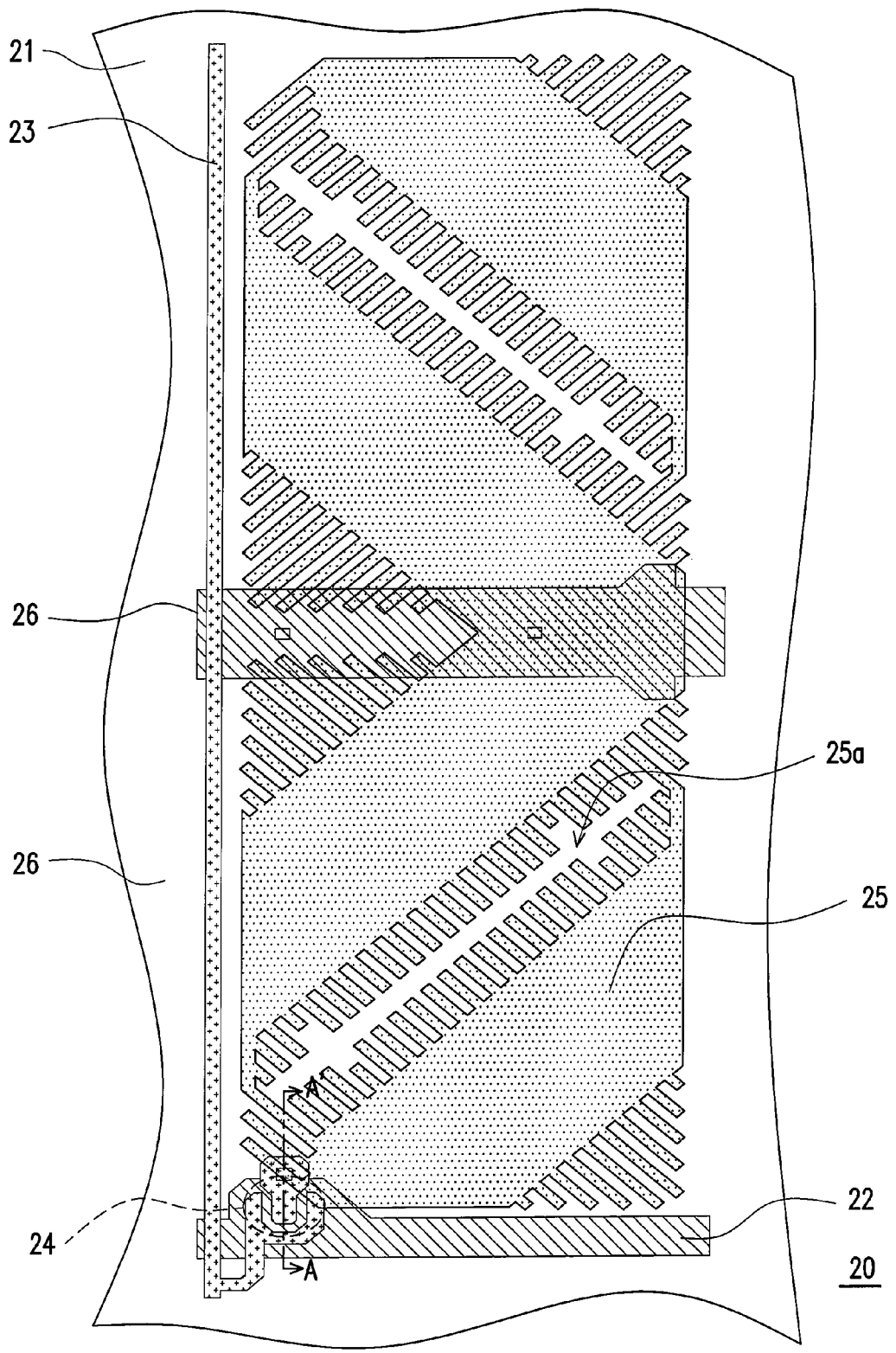
FIG. 1B is a top view of a TFT array substrate of the LCD panel as shown in FIG. 1A.
Figure 2A:
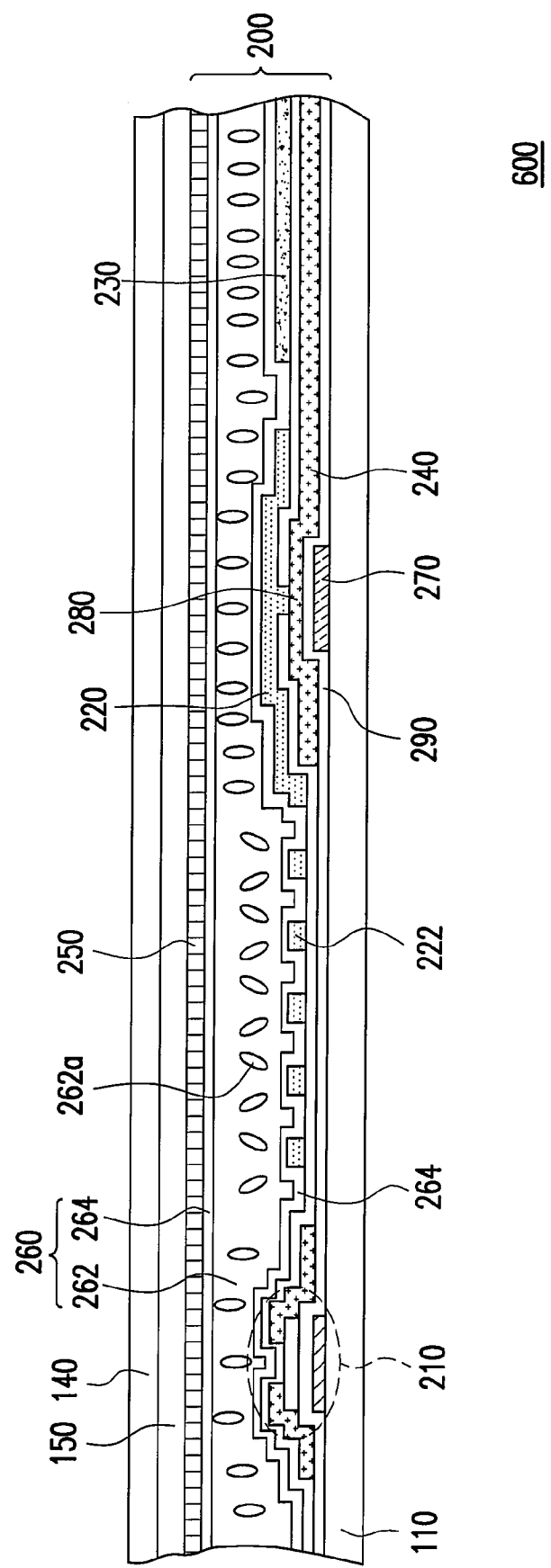
FIG. 2A is a partial schematic sectional view of an LCD panel according to the first embodiment of the present invention.
Figure 2B:
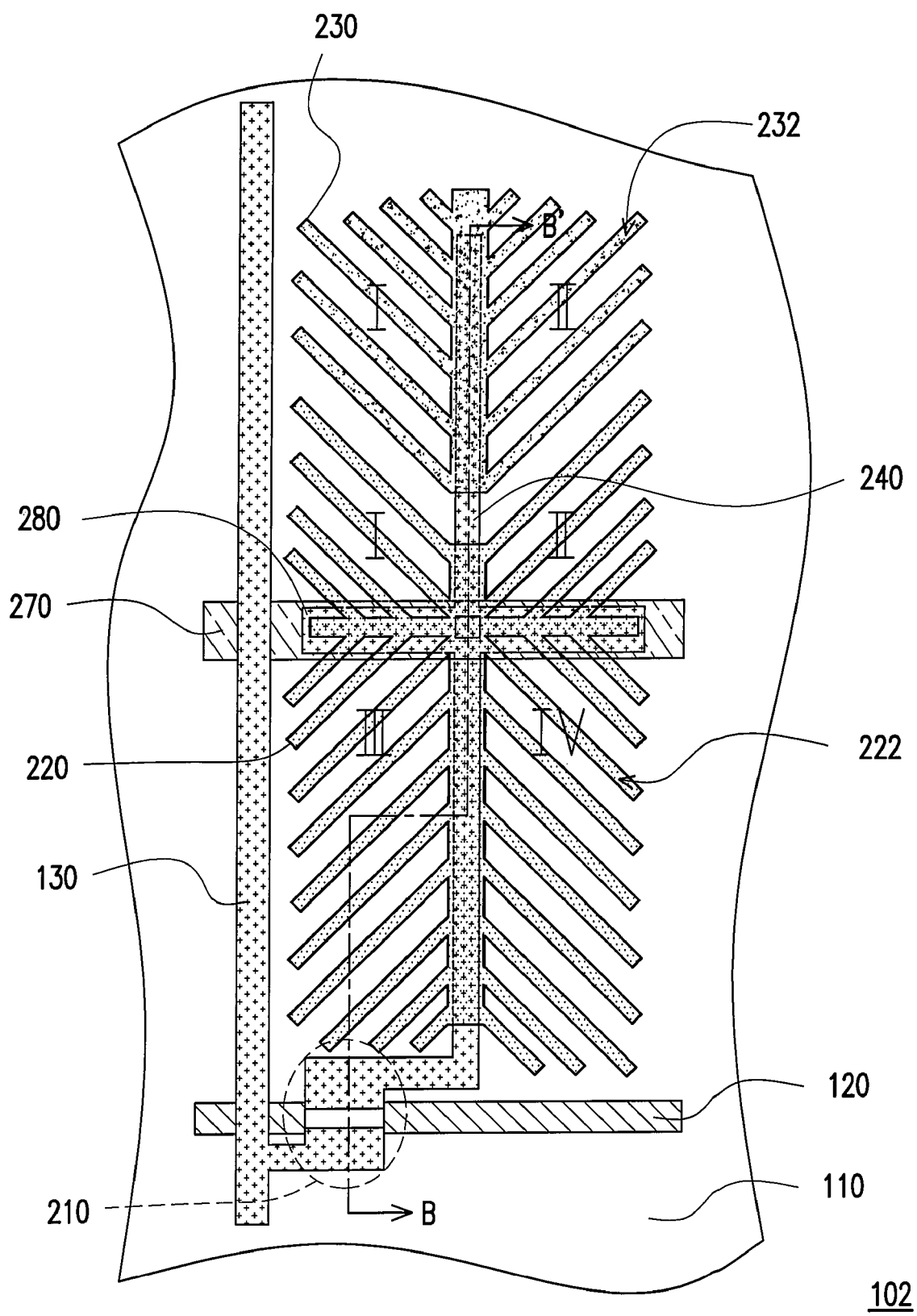
FIG. 2B is a top view of an active device array substrate according to the first embodiment of the present invention.

FIG. 2A is a partial schematic sectional view of an LCD panel according to the first embodiment of the present invention, and FIG. 2B is a top view of an active device array substrate according to the first embodiment of the present invention, wherein the schematic sectional view of the active device array substrate of FIG. 2A is taken along the section line B-B' in FIG. 2B. Referring to FIGS. 2A and 2B, the LCD panel 600 of the present embodiment comprises a lower substrate 110, an upper substrate 140, a color filter array 150, and a plurality of pixel structures 200. A plurality of scan lines 120 and a plurality of data lines 130 are formed on the lower substrate 110. The color filter array 150 is disposed between the lower substrate 110 and the upper substrate 140. The pixel structures 200 are disposed between the color filter array 150 and the lower substrate 110. The detailed structure, arrangement position, connection relation, and material of various elements will be illustrated below.

Referring to FIGS. 2A and 2B, the pixel structure 200 is fabricated on the lower substrate 110, and is electrically connected to one of the scan lines 120 and one of the data lines 130 on the lower substrate 110. As shown in FIGS. 2A and 2B, the pixel structure 200 comprises an active device 210, a first pixel electrode 220, a second pixel electrode 230, a coupling line 240, a common electrode 250, and a liquid crystal layer 260.

The active device 210 is disposed on the lower substrate 110, and is electrically connected to the corresponding scan line 120 and the corresponding data line 130. The first pixel electrode 220 and the second pixel electrode 230 have first stripped electrode patterns 222 and second stripped electrode patterns 232, respectively. The first stripped electrode patterns 222 and the second stripped electrode patterns 232 have a plurality of sets of extending directions respectively, and the second pixel electrode 230 is electrically insulated from the first pixel electrode 220. The coupling line 240 is disposed under the first pixel electrode 220 and the second pixel electrode 230, and is electrically insulated from the second pixel electrode 230. The first pixel electrode 220 is electrically connected to the active device 210 through the coupling line 240. The common electrode 250 is disposed over the first pixel electrode 220 and the second pixel electrode 230, and is formed without alignment patterns. The liquid crystal layer 260 is disposed between the common electrode 250 and the first pixel electrode 220, and between the common electrode 250 and the second pixel electrode 230. The liquid crystal layer 260 has a liquid crystal molecule layer 262 and two polymer layers 264, and the liquid crystal molecule layer 262 is disposed between the two polymer layers 264.

As described above, the lower substrate 110 and the upper substrate 140 are glass substrates, quartz substrates, or substrates made of other appropriate materials. The scan lines 120 are, for example, aluminum alloy wires or wires made of other appropriate conductive materials. The data lines 130 and the coupling line 240 are chromium wires, aluminum alloy wires, or wires made of other appropriate conductive materials. The color filter array 150 comprises, for example, a plurality of red color filter patterns, green color filter patterns, and blue color filter patterns. The active device 210 is, for example, a TFT or other tri-polar switching devices. The first pixel electrode 220 and the second pixel electrode 230 are, for example, transmissive electrodes, reflective electrodes, or transflective electrodes, and the material of the first pixel electrode 220 and the second pixel electrode 230 is indium tin oxide (ITO), indium zinc oxide (IZO), metals, or other transparent or non-transparent conductive materials. In addition, the material of the common electrode 250 is ITO, IZO, or other transparent conductive materials. The material of the liquid crystal molecule layer 262 is, for example, negative liquid crystal molecules. The material of the polymer layers 264 is, for example, an acrylic polymer, and the polymer layers 264 is obtained through UV polymerization of monomer materials.

In the present embodiment, the pixel structure 200 further comprises a common line 270 and a capacitor electrode 280, wherein the capacitor electrode 280 is disposed over the common line 270 and is electrically connected to the first pixel electrode 220. In addition, the common line 270 is disposed under the first pixel electrode 220, and the first pixel electrode 220 crosses the common line 270.

As shown in FIG. 2A, the pixel electrode structure 200 further comprise a dielectric layer 290 disposed between the capacitor electrode 280 and the common line 270. In other words, the capacitor electrode 280, the common line 270, and the dielectric layer 290 constitute a storage capacitor. More particularly, the lower substrate 110, the scan line 120, the data line 130, the active device 210, the first pixel electrode 220, the second pixel electrode 230, the coupling line 240, the common line 270, and the capacitor electrode 280 constitute the active device array substrate 102. In addition, the material of the dielectric layer 290 is, for example, silicon nitride or other appropriate materials. The common line 270 is, for example, an aluminum alloy wire or a wire made of other appropriate conductive materials. The material of the capacitor electrode 280 is, for example, chromium, aluminum alloy, or other appropriate conductive materials. It should be noted that in the present embodiment, the capacitor electrode 280 and the coupling line 240 are connected together, and are formed simultaneously. However, in another embodiment, the capacitor electrode 280 and the coupling line 240 are not limited to be connected together, and are not limited to be formed simultaneously.

Referring to FIG. 2B, four alignment regions I, II, III, and IV are defined by the plurality of sets of the first stripped electrode patterns 222 of the first pixel electrode 220, and two alignment regions I and II are defined by the plurality of sets of the second stripped electrode patterns 232 of the second pixel electrode 230. When the pixel structure 200 is not driven, the liquid crystal molecules 262a in the liquid crystal molecule layer 262 are affected by the alignment effect of the two polymer layers 264, and are arranged vertically to the lower substrate 110. When the pixel electrode 200 is driven, the liquid crystal molecules 262a in the liquid crystal molecule layer 262 are inclined to the direction parallel to the lower substrate 110. Particularly, the liquid crystal molecules 262a have substantially the same inclination direction in one of the alignment domains I, II, III, and IV, but the inclination directions of the liquid crystal molecules among the alignment domains I, II, III and IV are different. Through the arrangement of the liquid crystal molecules 262a inclined in multiple directions, the LCD panel 600 fabricated with the pixel structures 200 will have a large viewing angle.

Figure 2C:
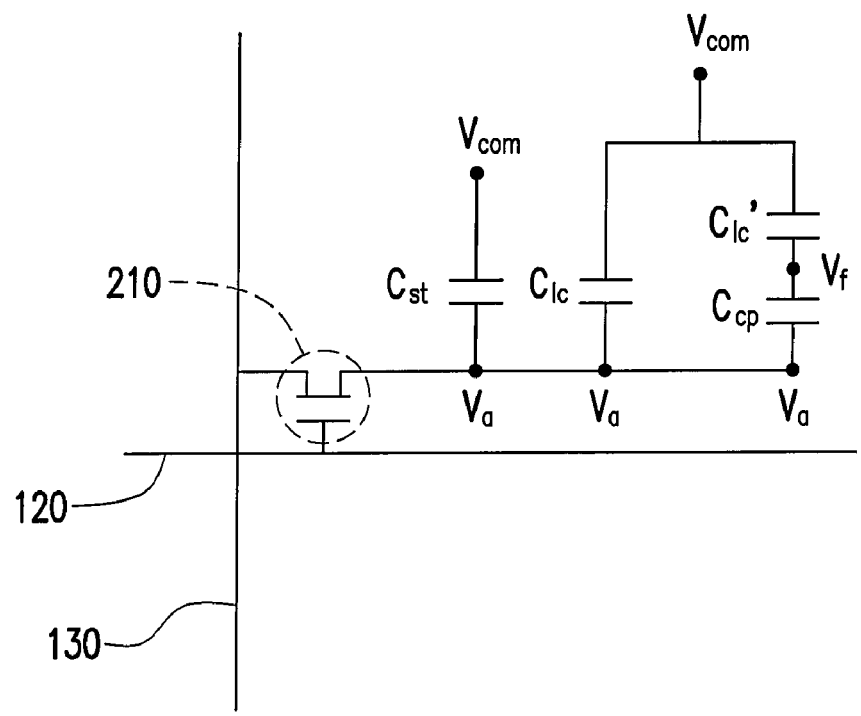
FIG. 2C is an equivalent circuit diagram of the pixel structure of FIG. 2A.

It should be noted that as shown in FIG. 2A, since the coupling line 240 is disposed under the second pixel electrode 230, the coupling line 240 and the second pixel electrode 230 constitute a capacitor $C_{cp}$ (as shown in FIG. 2C). Moreover, since the common electrode 250 is disposed over the first pixel electrode 220 and the second pixel electrode 230 which are electrically insulated from each other. The common electrode 250 together with the first pixel electrode 220 or the second pixel electrode 230 constitutes a capacitor $C_{1C}$ or a capacitor $C_{1C}{'}$ (as shown in FIG. 2C). The first pixel electrode 220 and the common line 270 constitute a capacitor $C_{st}$ (as shown in FIG. 2C).

FIG. 2C is an equivalent circuit diagram of the pixel structure of FIG. 2A. Referring to FIG. 2C, the lower electrode plate and the upper electrode plate of the capacitor $C_{cp}$ are the coupling line 240 and the second pixel electrode 230 respectively. The lower electrode plate and the upper electrode plate of the capacitor $C_{1c}{'}$ are the second pixel electrode 230 and the common electrode 250 respectively. The lower electrode plate and the upper electrode plate of the capacitor $C_{1c}$ are the first pixel electrode 220 and the common electrode 250 respectively. In addition, the lower electrode plate and the upper electrode plate of the capacitor $C_{st}$ are the first pixel electrode 220 (or the capacitor electrode 280) and the common electrode 270 respectively.

When the active device 210 is in the ON state, an external voltage $V_a$ is applied to the coupling line 240, such that the voltage of the lower electrode plate (i.e., the first pixel electrode 220 or the capacitor electrode 280) of the capacitor $C_{st}$, the lower electrode plate (i.e., the first pixel electrode 220) of the capacitor $C_{1c}$, and the lower electrode plate (i.e., the coupling line 240) of the capacitor $C_{cp}$ is $V_a$. As the capacitor $C_{1c}{'}$ and the capacitor $C_{cp}$ are connected in series, the voltage difference ($V_a-V_{com}$) is distributed on the two capacitors $C_{1c}{'}$ and $C_{cp}$. Thus, the voltage $V_f$ of the lower electrode plate (i.e., the second pixel electrode 230) of the capacitor $C_{1c}{'}$ is different from the external voltage $V_a$.

Figure 2D:
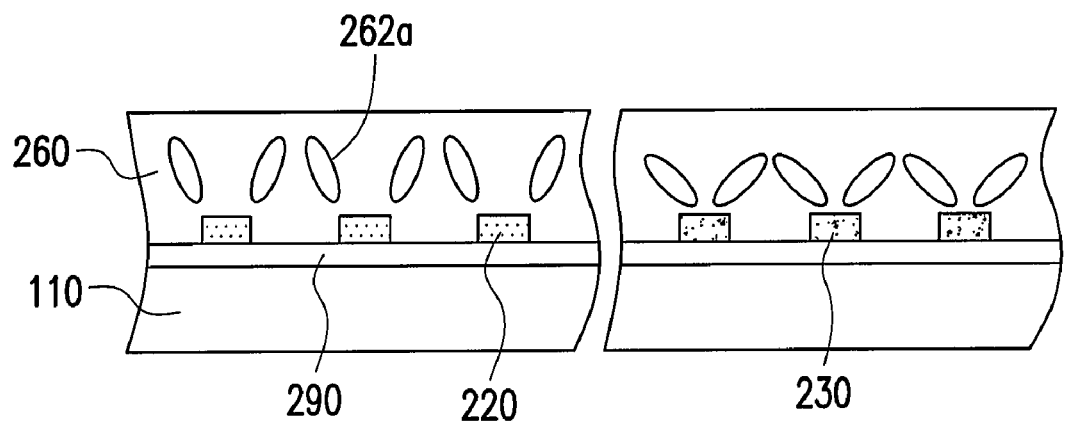
FIG. 2D is a schematic view of the inclination of the liquid crystal molecules over the first pixel electrode and the second pixel electrode in FIG. 2A.

FIG. 2D is a schematic view of the inclination of the liquid crystal molecules over the first pixel electrode and the second pixel electrode in FIG. 2A. Referring to FIG. 2D, if the overlapped area of the second pixel electrode 230 and the coupling line 240 is changed, the value of $C_{1c}{'}$ can be adjusted, and the voltage $V_f$ of the lower electrode plate (i.e., the second pixel electrode 230) of the capacitor $C_{1c}{'}$ is adjusted accordingly. Therefore, if the voltage $V_f$ is changed, the inclination degree of the liquid crystal molecules 262a over the second pixel electrode 230 is changed. By adjusting the inclination degree of the liquid crystal molecules 262a over the first pixel electrode 220 and the second pixel electrode 230, the phenomenon of color wash-out of the LCD panel 600 can be eliminated. In addition, since the LCD panel 600 fabricated with the pixel structures 200 is designed without protrusions, the LCD panel 600 will have high aperture ratio.

It should be noted that the direction and degree of inclination of the liquid crystal molecules 262a as shown in FIG. 2D is exemplary and is only to illustrate the efficacy of the pixel structures 200. The direction and degree of inclination of the liquid crystal molecules 262a may vary in practice.

The Second Embodiment

Figure 3A:
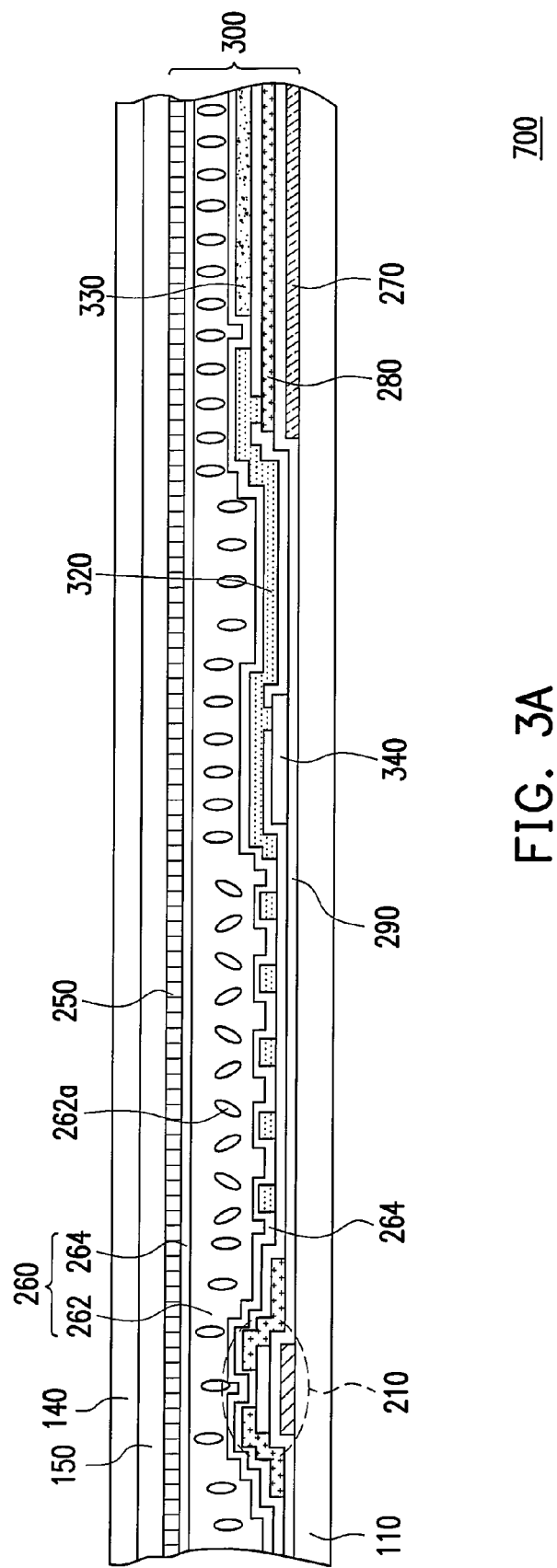
FIG. 3A is a partial schematic sectional view of an LCD panel according to the second embodiment of the present invention.
Figure 3B:
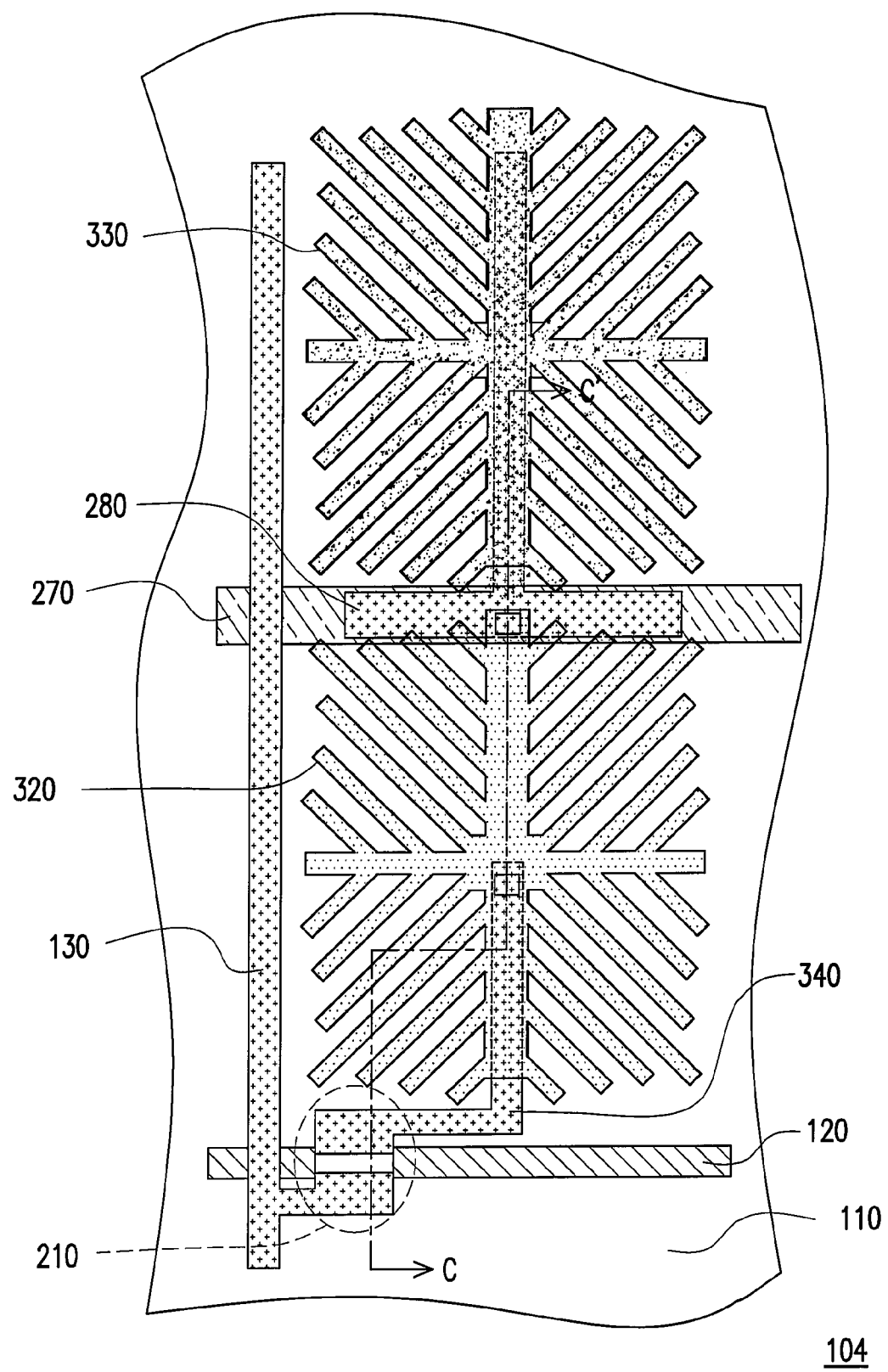
FIG. 3B is a top view of an active device array substrate according to the second embodiment of the present invention.

FIG. 3A is a partial schematic sectional view of an LCD panel according to the second embodiment of the present invention, and FIG. 3B is a top view of an active device array substrate according to the second embodiment of the present invention, wherein the schematic sectional view of the active device array substrate of FIG. 3A is taken along the section line C-C' in FIG. 3B. Referring to FIGS. 3A and 3B, the LCD panel 700 of the present embodiment is a variation of the LCD panel 600 of the first embodiment, and wherein the first pixel electrode 320 and the second pixel electrode 330 of the pixel structure 300 are respectively disposed on two opposite sides of the common line 270, and the coupling line 340 is not connected to the capacitor electrode 280.

As the advantages of the LCD panel 700 and the pixel structure 300 are substantially the same as those described in the first embodiment, the details will not be described herein again.

The Third Embodiment

Figure 4A:
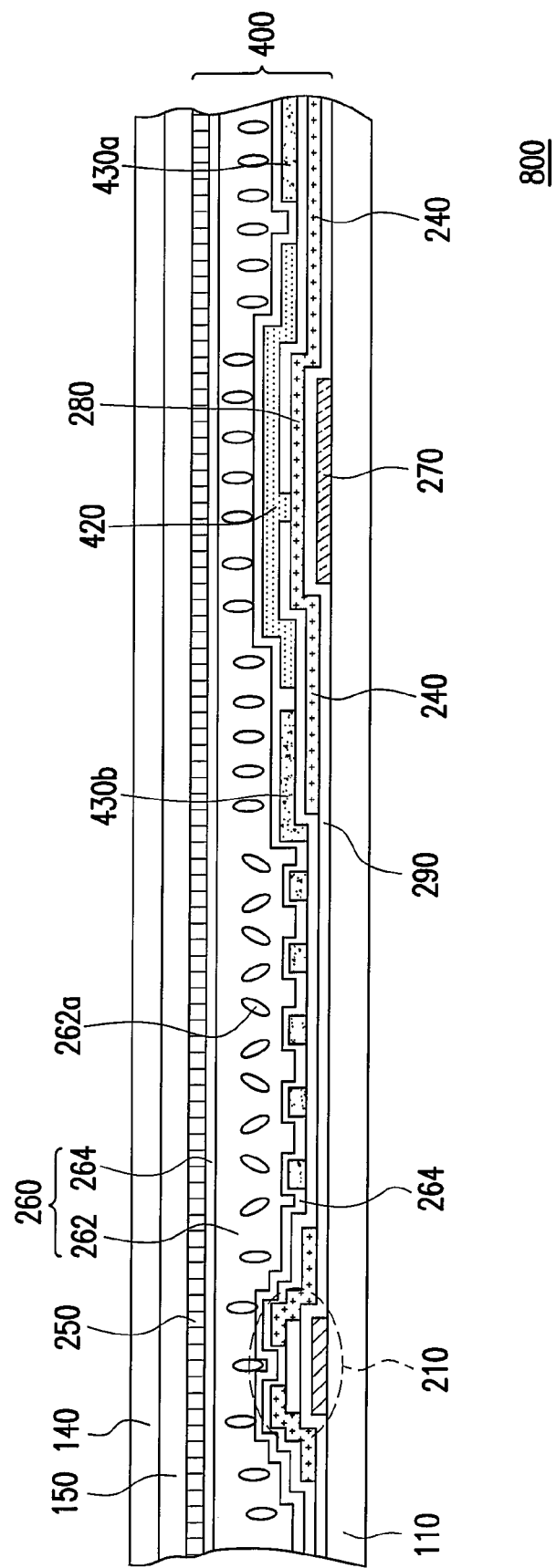
FIG. 4A is a partial schematic sectional view of an LCD panel according to the third embodiment of the present invention.
Figure 4B:
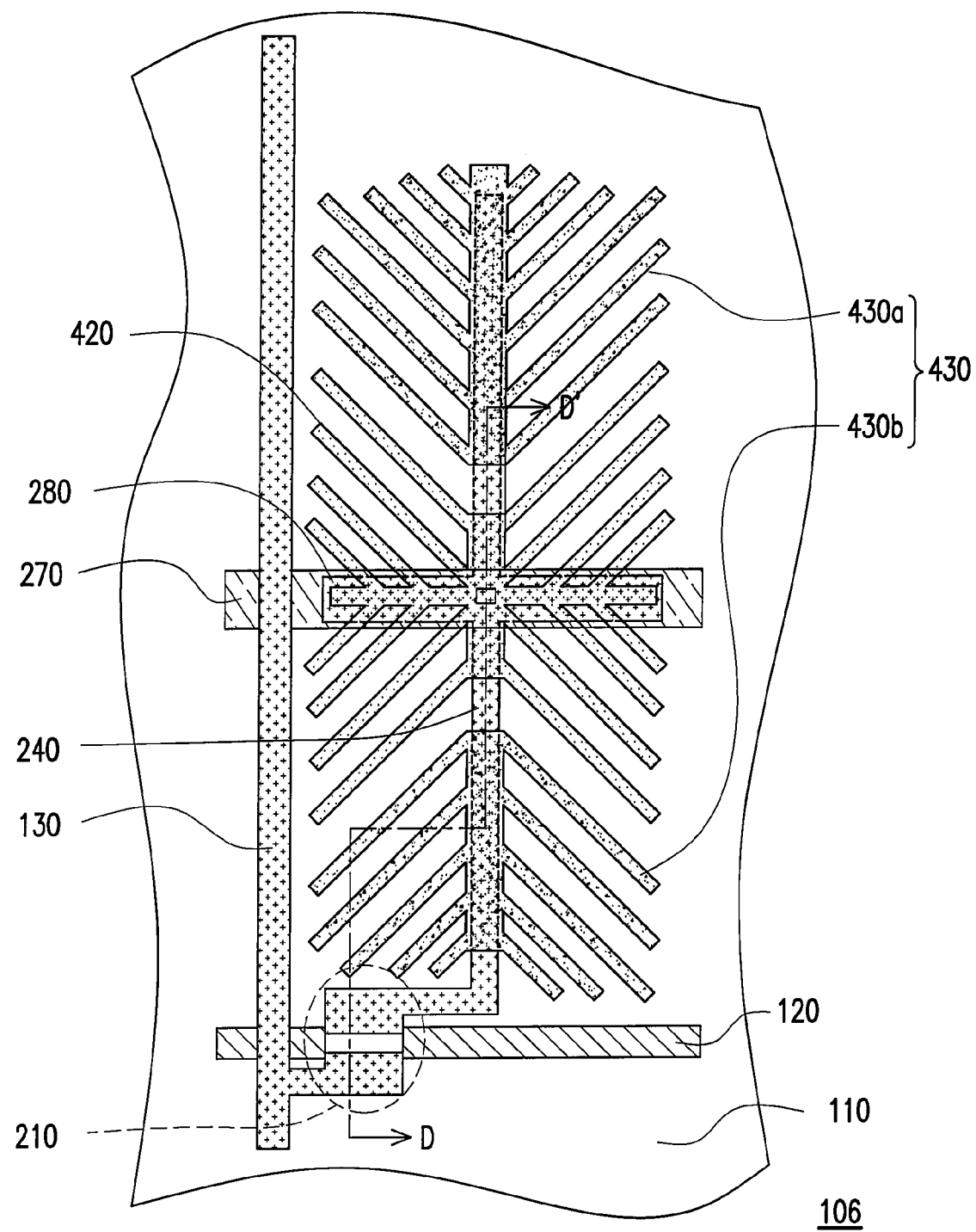
FIG. 4B is a top view of an active device array substrate according to the third embodiment of the present invention.

FIG. 4A is a partial schematic sectional view of an LCD panel 800 according to the third embodiment of the present invention, and FIG. 4B is a top view of an active device array substrate according to the third embodiment of the present invention, wherein the schematic sectional view of the active device array substrate of FIG. 4A is taken along the section line D-D' in FIG. 4B. Referring to FIGS. 4A and 4B, the LCD panel 800 of the present embodiment is a variation of the LCD panel 600 of the first embodiment, and wherein the second pixel electrode 430 of the pixel structure 400 comprises a first sub-pixel electrode 430a and a second sub-pixel electrode 430b. And the first sub-pixel electrode 430a and the second sub-pixel electrode 430b are disposed respectively on two opposite sides of the first pixel electrode 420.

As the advantages of the LCD panel 800 and the pixel structure 400 are substantially the same as those described in the first embodiment, the details will not be described herein again.

The Fourth Embodiment

In the aforementioned conventional art, the transparent electrodes 25 are confined between the adjacent scan lines 22 and the adjacent data lines 23. However, this design does not effectively divide the pixel electrodes 25. In order to make effective use of the pixel electrodes, the present embodiment provides a LCD panel and a pixel structure.

Figure 5A:
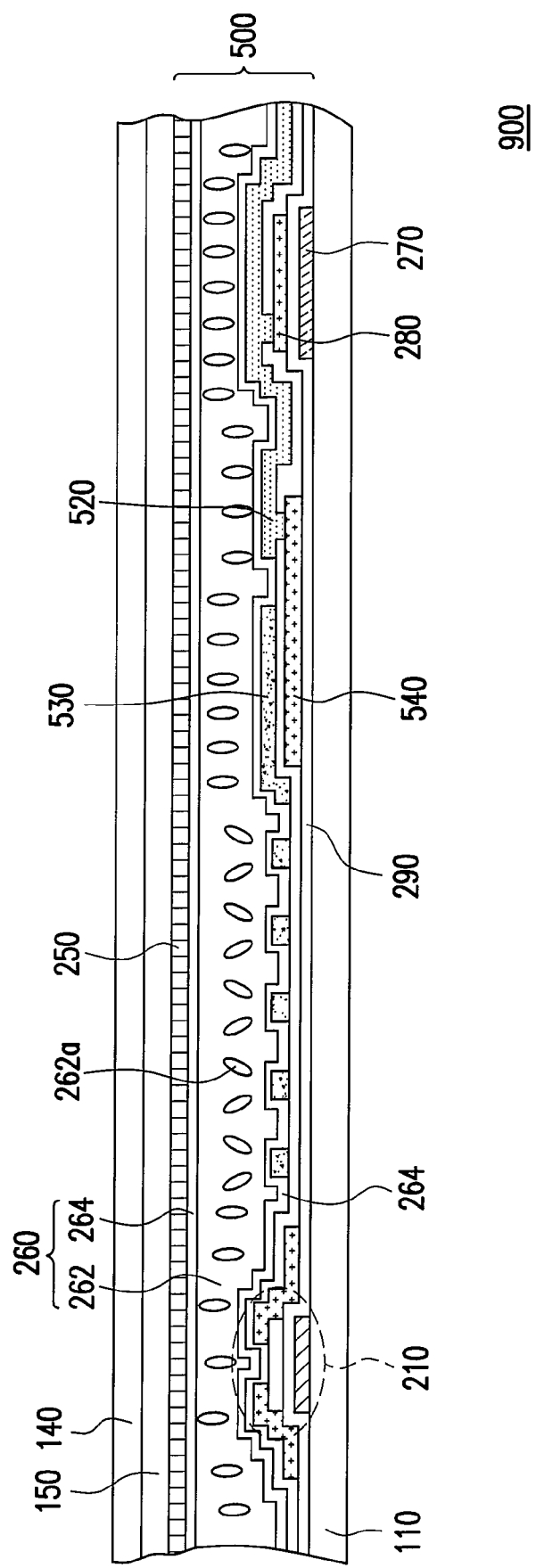
FIG. 5A is a partial schematic sectional view of an LCD panel according to the fourth embodiment of the present invention.
Figure 5B:
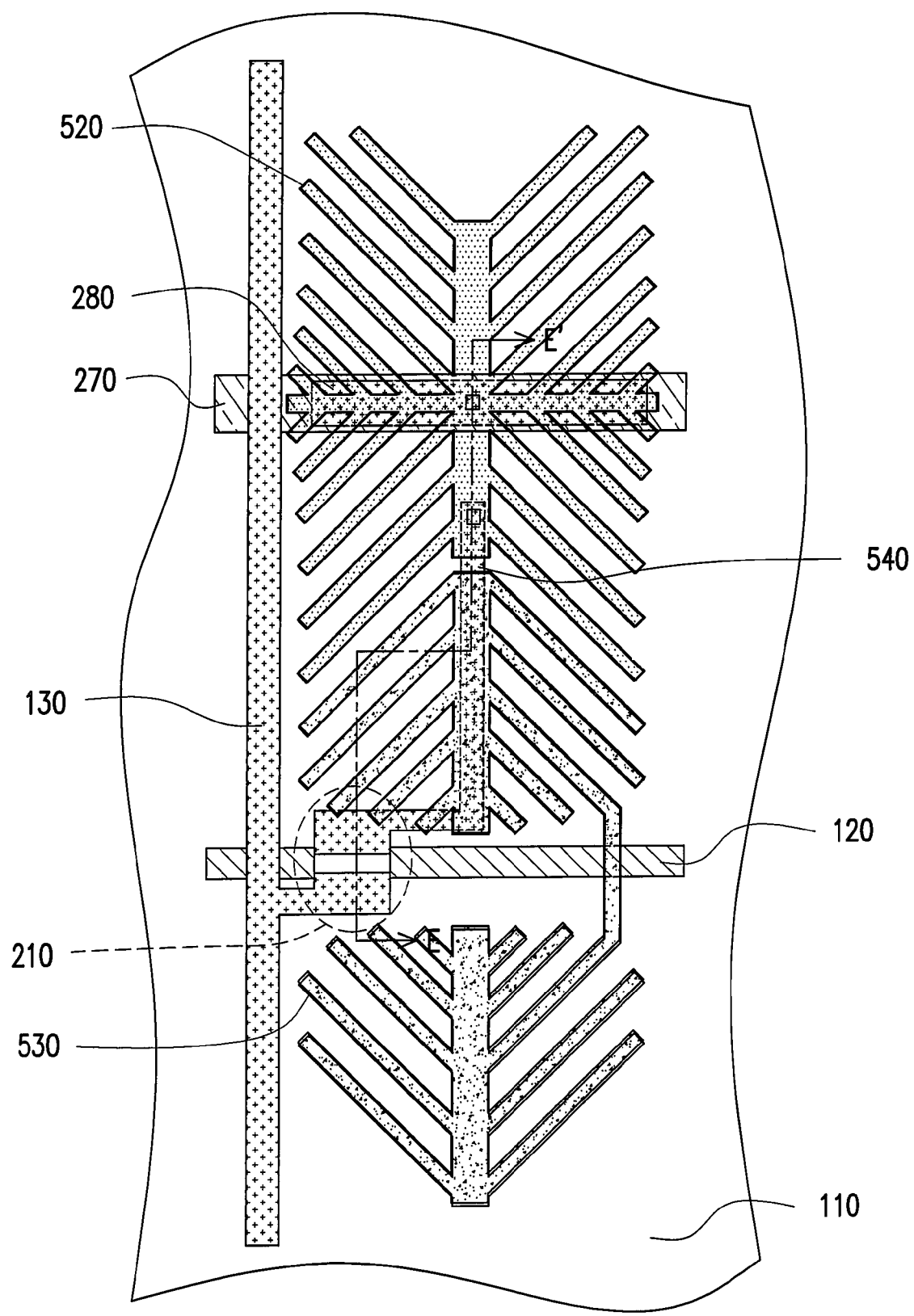
FIG. 5B is a top view of an active device array substrate according to the fourth embodiment of the present invention.

FIG. 5A is a partial schematic sectional view of an LCD panel according to the fourth embodiment of the present invention, and FIG. 5B is a top view of an active device array substrate according to the fourth embodiment of the present invention, wherein the schematic sectional view of the active device array substrate of FIG. 5A is taken along the section line E-E' in FIG. 5B. Referring the FIGS. 5A and 5B, the LCD panel 900 is similar to the LCD panel 600 of the first embodiment, and wherein the second pixel electrode 530 of the pixel structure 500 is disposed on two opposite sides of the scan lines 120, and is electrically connected. In addition, the pixel structure 500 comprises a coupling line 540, and the coupling line 540 is electrically connected between the first pixel electrode 520 and the active device 210, and is not connected to the capacitor electrode 280.

Different from the conventional art that confines the transparent electrodes 25 between the adjacent scan lines 22 and the adjacent data lines 23, in the present embodiment, the second pixel electrode 530 of the pixel structure 500 is disposed on two opposite sides of the scan lines 120. Thus the pixel electrodes can be divided more flexibly, thereby making effective use of the pixel electrodes to improve the aperture ratio. Thus, if the LCD panel 900 is fabricated by the use of the pixel structure 500, the LCD panel 900 will have higher aperture ratio and higher luminance. It should be noted that in the present embodiment, the coupling line 540 is not connected to the capacitor electrode 280. However, in other embodiments, the capacitor electrode 280 can be connected to the coupling line 240, and they can be formed at the same time.

To sum up, the pixel structures of the present invention have at least the following advantages.

1. In the pixel structures of the present invention, the interaction between the liquid crystal molecule layer and the two polymer layers makes the liquid crystal molecules presenting specific arrangements. In other words, the pixel structures of the present invention can achieve the effect of alignment without adopting protrusions. Therefore, LCD panels fabricated with pixel structures of the present invention have higher aperture ratio and higher luminance.

2. In the LCD panel of one of the first to the third embodiments, the coupling line and the second pixel electrode of the pixel structure constitute a coupling capacitor. The capacitance value of the coupling capacitor can be adjusted to allow the liquid crystal molecules over the first pixel electrode and the second pixel electrode having different inclination degrees, thereby eliminating the phenomenon of color washout.

3. In the LCD panel of the fourth embodiment, the second pixel electrode of the pixel structure is disposed on two opposite sides of the scan line. Compared with the conventional art that confines the pixel electrode between two adjacent scan lines and two adjacent data lines, the pixel electrodes can be divided more flexibly, thereby making effective use of the pixel electrode and improving the aperture ratio and the luminance of the LCD panel.

4. The methods of fabricating the LCD panel and the pixel structures are compatible with existing processes. And additional processing equipment is not required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
   a scan line and a data line;
   an active device electrically connected to the scan line and the data line;
   a first pixel electrode having a plurality of sets of first stripped electrode patterns extending along different directions;
   a second pixel electrode having a plurality of sets of second stripped electrode patterns extending along different directions, wherein the second pixel electrode is electrically insulated from the first pixel electrode, and the second pixel electrode comprises:
   a first sub-pixel electrode; and
   a second sub-pixel electrode, wherein the first sub-pixel electrode and the second sub-pixel electrode are disposed on two opposite sides of the first pixel electrode, respectively;
   a coupling line disposed under the first pixel electrode and the second pixel electrode, wherein the first pixel electrode is electrically connected to the active device through the coupling line, and the coupling line is electrically insulated from the second pixel electrode;
   a common electrode disposed over the first pixel electrode and the second pixel electrode; and
   a liquid crystal layer, disposed between the common electrode and the first pixel electrode and between the common electrode and the second pixel electrode, comprising a liquid crystal molecule layer and two polymer layers, wherein the liquid crystal molecule layer is disposed between the two polymer layers.

2. The pixel structure as claimed in claim 1, wherein the common electrode is formed without alignment patterns.

3. The pixel structure as claimed in claim 1, wherein the polymer layers comprise an acrylic polymer.

4. The pixel structure as claimed in claim 1, further comprising:
   a common line; and
   a capacitor electrode disposed over the common line and electrically connected to the first pixel electrode.

5. The pixel structure as claimed in claim 4, wherein the common line is disposed under the first pixel electrode, and the first pixel electrode crosses the common line.

6. The pixel structure as claimed in claim 4, further comprising a dielectric layer disposed between the capacitor electrode and the common line.

7. A pixel structure, comprising:
   a scan line and a data line;
   an active device electrically connected to the scan line and the data line;
   a first pixel electrode having a plurality of sets of first stripped electrode patterns extending along different directions;
   a second pixel electrode having a plurality of sets of second stripped electrode patterns extending along different directions, wherein the second pixel electrode is electrically insulated from the first pixel electrode, and the second pixel electrode comprises:
   a first sub-pixel electrode; and
   a second sub-pixel electrode, wherein the first sub-pixel electrode and the second sub-pixel electrode are disposed on two opposite sides of the scan line, respectively, and are electrically connected to each other;
   a coupling line disposed under the first pixel electrode and the second pixel electrode, wherein the first pixel electrode is electrically connected to the active device through the coupling line, and the coupling line is electrically insulated from the second pixel electrode;
   a common electrode disposed over the first pixel electrode and the second pixel electrode; and
   a liquid crystal layer, disposed between the common electrode and the first pixel electrode and between the common electrode and the second pixel electrode, comprising a liquid crystal molecule layer and two polymer layers, wherein the liquid crystal molecule layer is disposed between the two polymer layers 8. The pixel structure as claimed in claim 7, wherein the common electrode is formed without alignment patterns.

9. The pixel structure as claimed in claim 7, wherein the polymer layers comprise an acrylic polymer.

10. The pixel structure as claimed in claim 7, further comprising:
    a common line; and
    a capacitor electrode disposed over the common line and electrically connected to the first pixel electrode.

11. The pixel structure as claimed in claim 10, wherein the common line is disposed under the first pixel electrode, and the first pixel electrode crosses the common line.

12. The pixel structure as claimed in claim 10, wherein the first pixel electrode and the second pixel electrode are disposed on two opposite sides of the common line, respectively.

13. The pixel structure as claimed in claim 10, further comprising a dielectric layer disposed between the capacitor electrode and the common line.

14. A liquid crystal display panel, comprising:
    a lower substrate;
    an upper substrate disposed over the lower substrate;
    a color filter array disposed between the upper substrate and the lower substrate;

a plurality of pixel structures disposed between the color filter array and the lower substrate, each of the pixel structures comprises:
a scan line and a data line;
an active device electrically connected to the scan line and the data line;
a first pixel electrode having a plurality of sets of first stripped electrode patterns extending along different directions;
a second pixel electrode having a plurality of sets of second stripped electrode patterns extending along different directions, wherein the second pixel electrode is electrically insulated from the first pixel electrode, and the second pixel electrode comprises:
a first sub-pixel electrode; and
a second sub-pixel electrode, wherein the first sub-pixel electrode and the second sub-pixel electrode are disposed on two opposite sides of the first pixel electrode, respectively;
a coupling line disposed under the first pixel electrode and the second pixel electrode, wherein the first pixel electrode is electrically connected to the active device through the coupling line, and the coupling line is electrically insulated from the second pixel electrode;
a common electrode disposed over the first pixel electrode and the second pixel electrode;
a liquid crystal layer, disposed between the common electrode and the first pixel electrode and between the common electrode and the second pixel electrode, comprising a liquid crystal molecule layer and two polymer layers, wherein the liquid crystal molecule layer is disposed between the two polymer layers.

15. The liquid crystal display panel as claimed in claim 14, wherein the common electrode is formed without alignment patterns.

16. The liquid crystal display panel as claimed in claim 14, wherein the polymer layers comprise an acrylic polymer.

17. The liquid crystal display panel as claimed in claim 14, wherein each of the pixel structures further comprises:
a common line;
a capacitor electrode disposed over the common line and electrically connected to the first pixel electrode; and
a dielectric layer disposed between the capacitor electrode and the common line.

18. A liquid crystal display panel, comprising:
a lower substrate;
an upper substrate disposed over the lower substrate;
a color filter array disposed between the upper substrate and the lower substrate;
a plurality of pixel structures disposed between the color filter array and the lower substrate, each of the pixel structures comprises:
a scan line and a data line;
an active device electrically connected to the scan line and the data line;
a first pixel electrode having a plurality of sets of first stripped electrode patterns extending along different directions;
a second pixel electrode having a plurality of sets of second stripped electrode patterns extending along different directions, wherein the second pixel electrode is electrically insulated from the first pixel electrode, the second pixel electrode comprises:
a first sub-pixel electrode; and
a second sub-pixel electrode, wherein the first sub-pixel electrode and the second sub-pixel electrode are disposed on two opposite sides of the scan line, respectively, and are electrically connected to each other;
a coupling line disposed under the first pixel electrode and the second pixel electrode, wherein the first pixel electrode is electrically connected to the active device through the coupling line, and the coupling line is electrically insulated from the second pixel electrode;
a common electrode disposed over the first pixel electrode and the second pixel electrode;
a liquid crystal layer, disposed between the common electrode and the first pixel electrode and between the common electrode and the second pixel electrode, comprising a liquid crystal molecule layer and two polymer layers, wherein the liquid crystal molecule layer is disposed between the two polymer layers.

19. The liquid crystal display panel as claimed in claim 18, wherein the common electrode is formed without alignment patterns.

20. The liquid crystal display panel as claimed in claim 18 wherein the polymer layers comprise an acrylic polymer.

21. The liquid crystal display panel as claimed in claim 18, wherein each of the pixel structures further comprises:
a common line;
a capacitor electrode disposed over the common line and electrically connected to the first pixel electrode; and
a dielectric layer disposed between the capacitor electrode and the common line.

* * * * *